(12) United States Patent
Su et al.

(10) Patent No.: US 12,444,778 B2
(45) Date of Patent: Oct. 14, 2025

(54) BATTERY SYSTEM INCLUDING ALTERNATING CURRENT, FAST-CHARGEABLE CAPACITOR ASSISTED BATTERIES

(71) Applicant: GM GLOBAL TECHNOLOGY OPERATIONS LLC, Detroit, MI (US)

(72) Inventors: Qili Su, Shanghai (CN); Dewen Kong, Shanghai (CN); Si Chen, Shanghai (CN); Haijing Liu, Shanghai (CN); Dave G. Rich, Sterling Heights, MI (US); Lyall K. Winger, Waterloo (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 849 days.

(21) Appl. No.: 17/563,295

(22) Filed: Dec. 28, 2021

(65) Prior Publication Data

US 2023/0093233 A1    Mar. 23, 2023

(30) Foreign Application Priority Data

Sep. 18, 2021    (CN) .......................... 202111097942.2

(51) Int. Cl.
*H01M 10/42* (2006.01)
*H01M 10/44* (2006.01)
*H02J 7/00* (2006.01)

(52) U.S. Cl.
CPC ....... *H01M 10/4264* (2013.01); *H01M 10/44* (2013.01); *H02J 7/0013* (2013.01); *H01M 2220/20* (2013.01)

(58) Field of Classification Search
CPC ............. H01M 10/4264; H01M 10/44; H01M 2220/20; H02J 7/0013
See application file for complete search history.

(56) References Cited

U.S. PATENT DOCUMENTS

| | | | |
|---|---|---|---|
| 10,297,885 B2 | 5/2019 | Gayden et al. | |
| 10,658,663 B2 | 5/2020 | Zhang et al. | |
| 10,826,139 B2 | 11/2020 | Rich et al. | |
| 10,944,100 B2 | 3/2021 | Liu et al. | |
| 2019/0061555 A1 | 2/2019 | Liu et al. | |
| 2019/0067754 A1* | 2/2019 | Gu .......................... B60L 50/66 |
| 2019/0341648 A1 | 11/2019 | Wu et al. | |
| 2019/0372127 A1 | 12/2019 | Li et al. | |
| 2020/0036053 A1 | 1/2020 | Li et al. | |

(Continued)

OTHER PUBLICATIONS

U.S. Appl. No. 17/542,169, filed Dec. 3, 2021, Kong et al.

*Primary Examiner* — Dah-Wei D. Yuan (57) ABSTRACT

A capacitor assisted battery module includes a first diode including an anode and a cathode. A second diode includes an anode and a cathode. The anode of the first diode is connected to the cathode of the second diode at a first node. A first capacitor assisted battery (CAB) block includes a positive terminal, a negative terminal and N CABs, where N is an integer greater than zero. The positive terminal of the first CAB block is connected to the cathode of the first diode. A second capacitor assisted battery (CAB) block includes a positive terminal, a negative terminal and N CABs, wherein the negative terminal of the second CAB block is connected to the anode of the second diode. The negative terminal of the first CAB block and the positive terminal of the second CAB block are connected to a second node.

20 Claims, 8 Drawing Sheets

(56) References Cited

U.S. PATENT DOCUMENTS

| | | |
|---|---|---|
| 2020/0036070 A1 | 1/2020 | Li et al. |
| 2020/0118770 A1 | 4/2020 | Liu et al. |
| 2020/0173028 A1 | 6/2020 | Liu et al. |
| 2020/0279695 A1 | 9/2020 | Lu et al. |
| 2020/0321648 A1 | 10/2020 | Liu et al. |
| 2021/0012975 A1 | 1/2021 | Su et al. |
| 2021/0021009 A1 | 1/2021 | Li et al. |
| 2021/0028481 A1 | 1/2021 | Hou et al. |
| 2021/0050157 A1 | 2/2021 | Hou et al. |
| 2021/0065992 A1 | 3/2021 | Lu et al. |
| 2021/0110979 A1 | 4/2021 | Que et al. |
| 2021/0110980 A1* | 4/2021 | Su et al. ................ H01G 11/08 |
| 2021/0111426 A1 | 4/2021 | Li et al. |
| 2021/0125791 A1 | 4/2021 | Li et al. |
| 2021/0135224 A1 | 5/2021 | Hou et al. |
| 2021/0151260 A1 | 5/2021 | Kong et al. |
| 2021/0151809 A1 | 5/2021 | Kong et al. |
| 2023/0083009 A1* | 3/2023 | Hamada ................ H01M 10/44 320/116 |

\* cited by examiner

BATTERY SYSTEM INCLUDING ALTERNATING CURRENT, FAST-CHARGEABLE CAPACITOR ASSISTED BATTERIES

CROSS-REFERENCE TO RELATED APPLICATIONS

This application claims the benefit of Chinese Patent Application No. 202111097942.2, filed on Sep. 18, 2021. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery systems for vehicles, and more particularly to a battery system including capacitor-assisted batteries.

Hybrid and electric vehicles include one or more motors that are powered by a battery system and that propel the vehicle. The battery system can be recharged using utility power, by another vehicle, during regeneration and/or by an internal combustion engine (for hybrid vehicle applications). During operation of the hybrid and/or electric vehicle, power that is generated during braking of the vehicle may be used to recharge a battery system of the vehicle. Instead of braking the vehicle using mechanical brakes, the motor is operated as a generator to brake the vehicle and to generate power that is used to recharge the battery system.

SUMMARY

A capacitor assisted battery module includes a first diode including an anode and a cathode. A second diode includes an anode and a cathode. The anode of the first diode is connected to the cathode of the second diode at a first node. A first capacitor assisted battery (CAB) block includes a positive terminal, a negative terminal and N CABs, where N is an integer greater than zero. The positive terminal of the first CAB block is connected to the cathode of the first diode. A second capacitor assisted battery (CAB) block includes a positive terminal, a negative terminal and N CABs, wherein the negative terminal of the second CAB block is connected to the anode of the second diode. The negative terminal of the first CAB block and the positive terminal of the second CAB block are connected to a second node.

In other features, the first node is configured for connection to a first terminal of an AC source. The second node is configured for connection to a second terminal of the AC source. Each of the N CABs of the first CAB block includes a capacitor and a battery connected in parallel with the capacitor. N is greater than one. N is greater than one and wherein the N CABs of the first CAB block are connected in series. N is greater than one and wherein the N CABs of the first CAB block are connected in parallel.

In other features, D first diodes connected in parallel with the first diode, where D is an integer greater than zero. D second diodes connected in parallel with the second diode.

A battery system includes M of the capacitor assisted battery modules of claim 1. The first node of a first one of the M capacitor assisted battery modules is configured for connection to a first terminal of an AC source. A first node of second to Mth ones of the M capacitor assisted battery modules are connected a second node of the first one to the (M-1)th ones of the M capacitor assisted battery modules, respectively. The second node of the Mth one of the M capacitor assisted battery modules is configured for connection to a second terminal of the AC source.

In other features, the capacitor comprises a lithium ion capacitor. The battery comprises a lithium ion battery.

A capacitor assisted battery module includes an AC switch comprising a first node and D first diodes. Anodes of the D first diodes are connected to the first node and where D is an integer greater than zero. Cathodes of D second diodes are connected to the first node. A first capacitor assisted battery (CAB) block includes a positive terminal, a negative terminal and N CABs, where N is an integer greater than zero. The positive terminal of the first CAB block is connected to the cathodes of the D first diodes. A second capacitor assisted battery (CAB) block includes a positive terminal, a negative terminal and N CABs, wherein the negative terminal of the second CAB block is connected to the anodes of the D second diodes. The negative terminal of the first CAB block and the positive terminal of the second CAB block are connected to a second node.

In other features, the first node is configured for connection to a first terminal of an AC source. The second node is configured for connection to a second terminal of the AC source. Each of the N CABs of the first CAB block includes a capacitor and a battery connected in parallel with the capacitor. N is greater than one. N is greater than one and the N CABs of the first CAB block are connected in series.

In other features, N is greater than one and wherein the N CABs of the first CAB block are connected in parallel. D first diodes are connected in parallel with the first diode, where D is an integer greater than zero. D second diodes connected in parallel with the second diode.

A battery system includes M of the capacitor assisted battery modules. The first node of a first one of the M capacitor assisted battery modules is configured for connection to a first terminal of an AC source. A first node of second to Mth ones of the M capacitor assisted battery modules are connected a second node of the first one to the (M−1)th ones of the M capacitor assisted battery modules, respectively. The second node of the Mth one of the M capacitor assisted battery modules is configured for connection to a second terminal of the AC source.

In other features, the capacitor comprises a lithium ion capacitor. The battery comprises a lithium ion battery.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 7 to 9B illustrate examples of other circuit arrangements including CAB modules according to the present disclosure.

In the drawings, reference numbers may be reused to identify similar and/or identical elements.

DETAILED DESCRIPTION

While the foregoing description relates to a battery system for a vehicle, the capacitor assisted battery (CAB) modules according to the present disclosure can be used in other non-vehicle applications.

Figure 1:
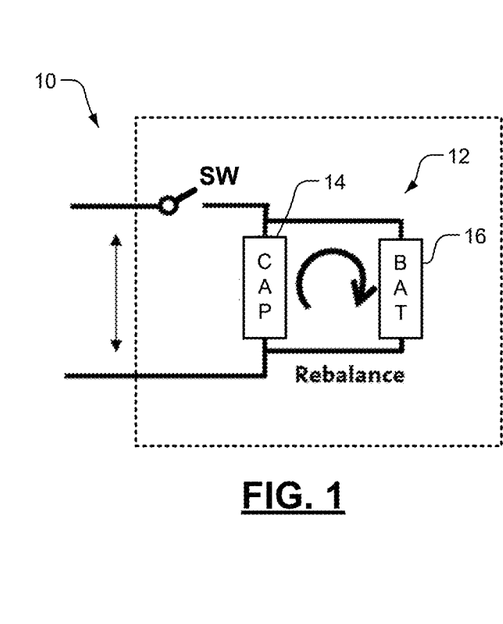
FIG. 1 is an electrical schematic of a capacitor assisted battery (CAB) module including a CAB and a switch.

Referring now to FIG. 1, a switched capacitor assisted battery (CAB) module 10 includes a switch SW connected in series with a CAB 12. The CAB 12 includes a positive terminal, a negative terminal and a capacitor 14 and a battery 16 connected between the positive terminal and the negative terminal of the CAB 12.

During recharging or regeneration, batteries without capacitors are not able to respond to fast changes in charging current, which reduces overall efficiency. Adding the capacitor 14 to the CAB 12 allows the CAB 12 to respond to fast changes in charging current. During charging, the capacitor 14 initially absorbs power and then the power is redistributed to the battery 16.

The switched CAB module 10 provides improved performance relative to a standard battery without capacitors during periods when fast changes in current occur within a short period of time, especially at low temperatures. However, some of the switched CAB modules 10 are unable to respond to power generated during regeneration events above a predetermined power level within a predetermined period. For example, a rise time or response time of the switch SW may limit the response of the switched CAB module 10 in these conditions.

Figure 2A:
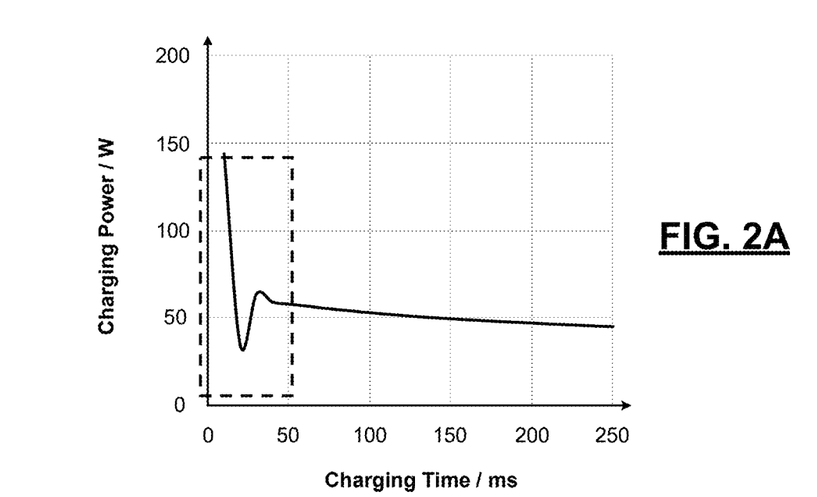
FIGS. 2A and 2B are graphs illustrating charging power as a function of time for the CAB module of FIG. 1.
Figure 2B:
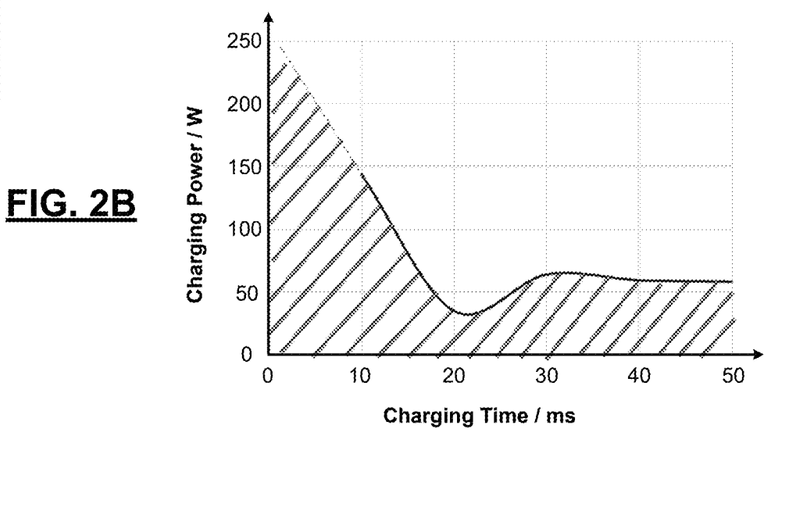

Referring now to FIGS. 2A and 2B, a non-limiting example of charging power as a function of time is shown for purposes of illustration. For example when the switched CAB module is rated at 6 amp-hours (Ah), it may have problems responding to charging power above a predetermined level (e.g. higher than 150 W) within a predetermined period (e.g. 10 ms) in some applications due to the rise time or response time of the switch SW. For example, the switching time may be around 250 ms. The switched CAB module 10 may be unable to capture a high regeneration pulse at low temperature (−29° C.) even though it has a high regeneration capability (>150 W) within the first 10$ms$ time range.

Figure 3A:
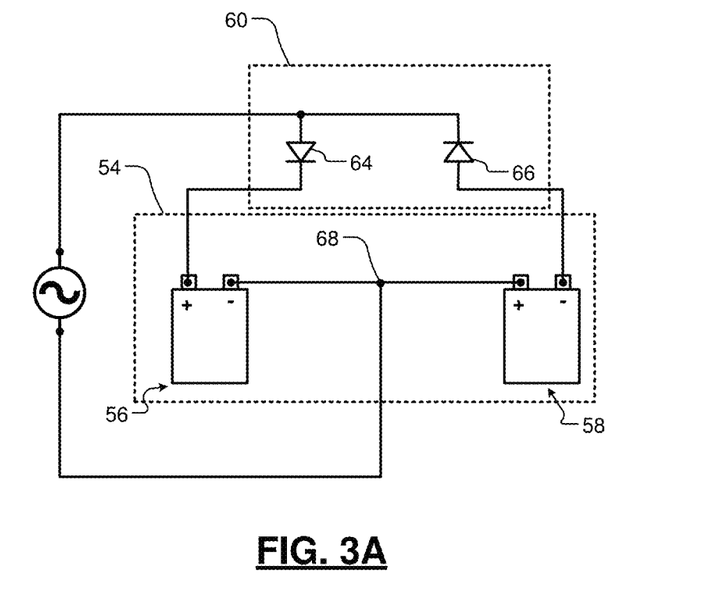
FIG. 3A is functional block diagram and electrical schematic of an example of a CAB module including a CAB and an AC switch according to the present disclosure.
Figure 3B:
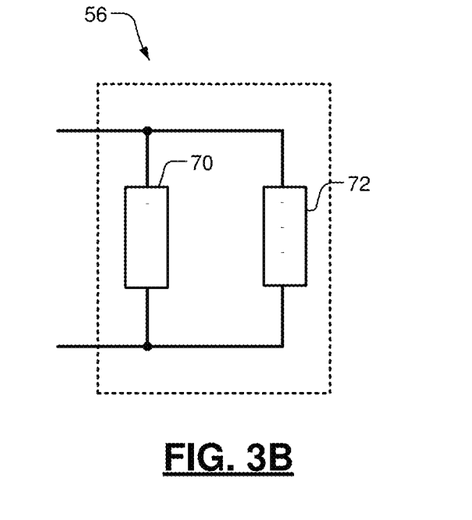
FIG. 3B is a functional block diagram and electrical schematic of an example of the CAB in FIG. 3A.
Figure 3C:
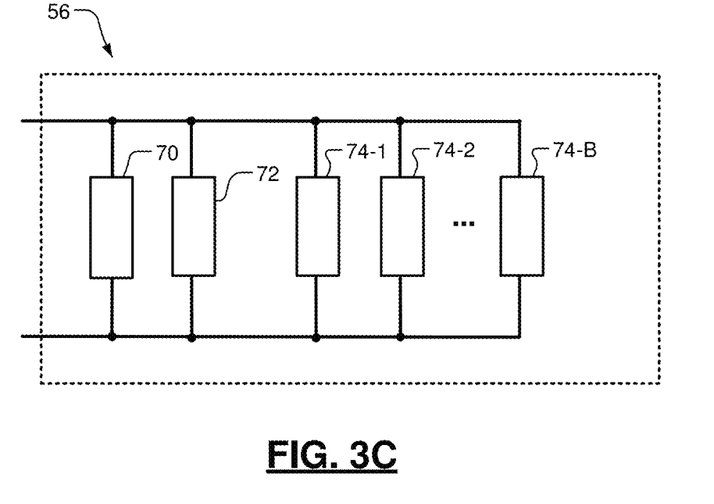
FIG. 3C is a functional block diagram and electrical schematic of another example of the CAB in FIG. 3A.

Referring now to FIGS. 3A to 3C, an example of CAB module that includes an AC switch including one or more pairs of anti-parallel diodes (instead of physical switches) according to the present disclosure is shown. In FIG. 3A, a CAB module 54 includes CABs 56 and 58 and an AC switch 60. The CABs 56 and 58 include a positive terminal, a negative terminal, one or more capacitors 70 and one or more batteries 72 as shown in FIG. 3B (and/or the battery 72 and one or more batteries 74 as shown in FIG. 3C) connected between the positive terminal and the negative terminal, and the AC switch 60. The AC switch 60 includes one or more pairs of the diodes 64 and 66.

The negative terminal of the CAB 56 is connected to a positive terminal of the CAB 58. A first terminal of an AC source is connected to an anode of the diode 64 and a cathode of the diode 66. A cathode of the diode 64 is connected to the positive terminal of the CAB 56. An anode of the diode 66 is connected to a negative terminal of the CAB 58. As will be described further below, the diodes 64 and 66 operate as an AC switch with a switching frequency defined by the frequency of the AC source.

A second terminal of the AC source is also connected to a node 68 located between the negative terminal of the CAB 56 and the positive terminal of the CAB 58. This arrangement allows the CAB module 54 to be charged quickly by an alternating current (AC) source without using the switch SW shown in FIG. 1. During a positive portion of an AC cycle, the diode 64 is forward biased while the diode 66 is reverse biased. During a negative portion of the AC cycle, the diode 66 is forward biased while the diode 64 is reverse biased. While a single pair of anti-parallel diodes are shown, additional pairs of anti-parallel diodes can be used as shown in FIG. 3D.

In some examples, the capacitor 70 includes one or more lithium ion capacitors (LIC) and the battery 72 includes one or more lithium ion batteries (LIB), although other chemistries may be used. In some examples, the fast response of the LIC in the CABs 56 and 58 are fully utilized repeatedly during short pulse charges and energy is rebalanced back to the LIB in the CABs 56 and 58, which enables fast charging of the CAB module 54, especially at low temperatures.

In FIG. 3B, the CAB 56 is shown to include a capacitor 70 and a battery 72. In FIG. 3C, the CAB 56 is shown to include the capacitor 70, the battery 72 and one or more additional batteries 74-1, 74-2, . . . and 74-B (collectively batteries 74), where B is an integer greater than zero. In some examples, the battery 72 and the one or more batteries 74 have the same chemistry. In other examples, the battery 72 and the one or more batteries 74 have different chemistries. Each of the batteries 72 and/or 74 include one or more battery cells.

Figure 3D:
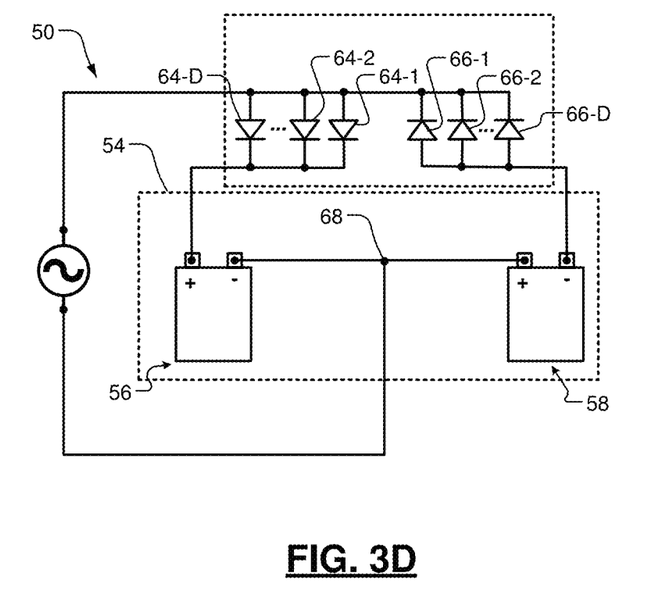
FIG. 3D is a functional block diagram and an electrical schematic of a CAB module including an AC switch with multiple pairs of anti-parallel diodes.

In FIG. 3D, the AC switch 60 is shown to include additional pairs of the diodes connected anti-parallel. The AC switch 60 includes diodes 64-1, 64-2, . . . , and 64-D and 66-1, 66-2, . . . , and 66-D (where D is an integer greater than one). Anodes of the diodes 64-1, 64-2, . . . , and 64-D are connected to the first terminal of the AC source and cathodes of the diodes 64-1, 64-2, . . . , and 64-D are connected to the positive terminal of the CAB 56. Cathodes of the diodes 66-1, 66-2, . . . , and 66-D are connected to the first terminal of the AC source and anodes of the diodes 66-1, 66-2, . . . , and 66-D are connected to the negative terminal of the CAB 56. A second terminal of the AC source is connected to the node 68.

Figure 4A:
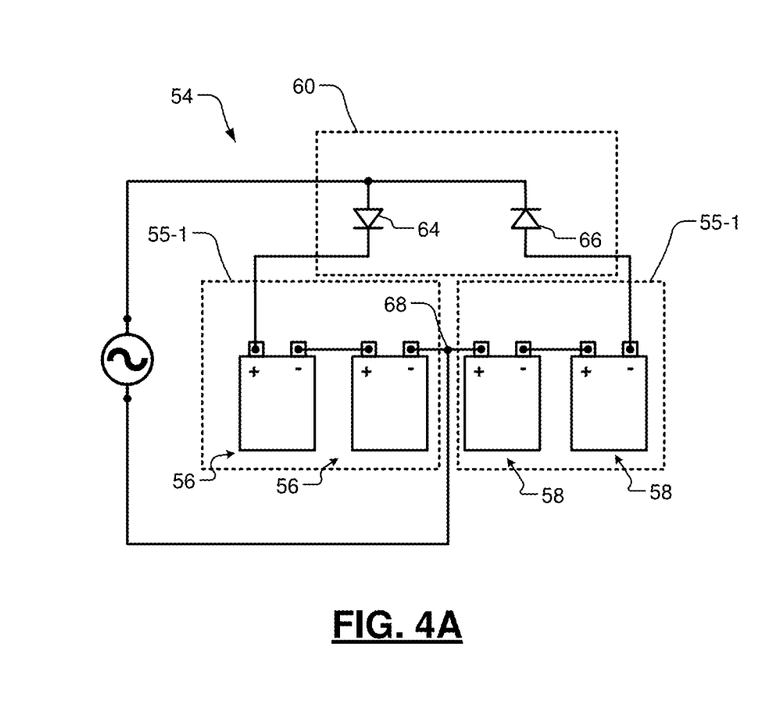
FIGS. 4A and 4B are functional block diagrams and electrical schematics of other examples of a CAB module including a CAB and an AC switch according to the present disclosure.
Figure 4B:
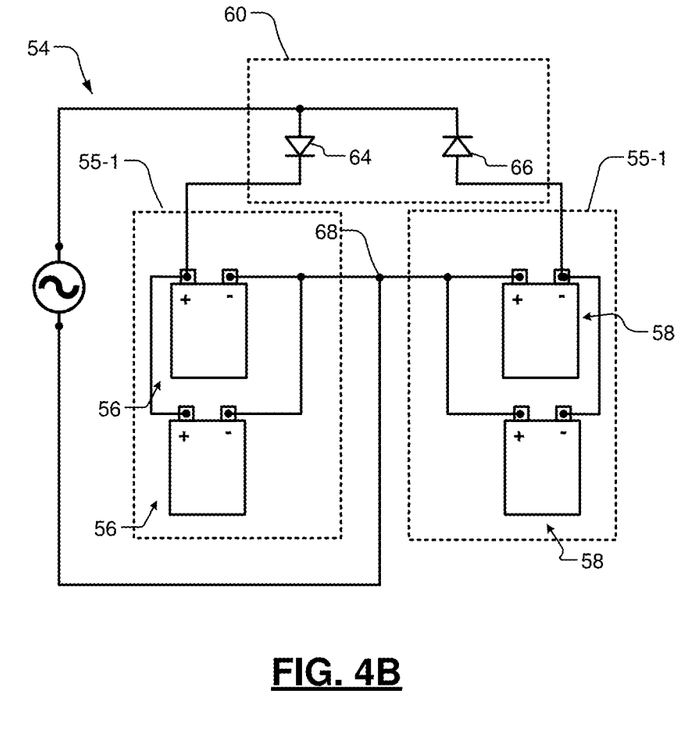

Referring now to FIGS. 4A and 4B, other arrangements are shown. In FIG. 4A, each CAB block 55-1 and 55-2 includes two or more CABs 56 or 58 connected in series between the cathode of the diode 64 and the node 68 and between the anode of the diode 66 and the node 68, respectively. In FIG. 4B, each CAB block 55-1 and 55-2 includes two or more CABs 56 connected in parallel between the cathode of the diode 64 and the node 68 and between the anode of the diode 66 and the node 68. As can be appreciated, other combinations of CAB blocks including serial and/or parallel connected CABs can be used between the cathode of the diode 64 and the node 68 and between the anode of the diode 66 and the node 68.

Figure 5A:
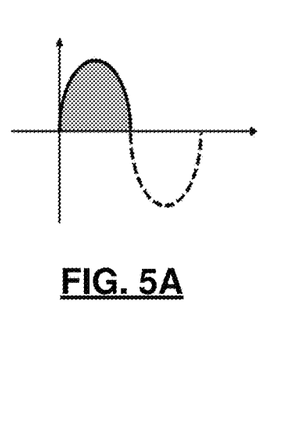
FIGS. 5A to 5D illustrate current flowing through the CAB module of FIG. 4A.
Figure 5B:
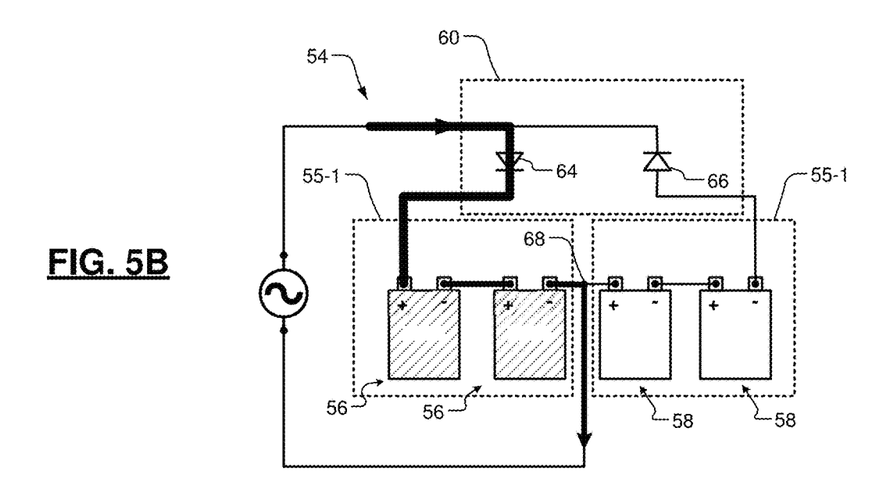
Figure 6:
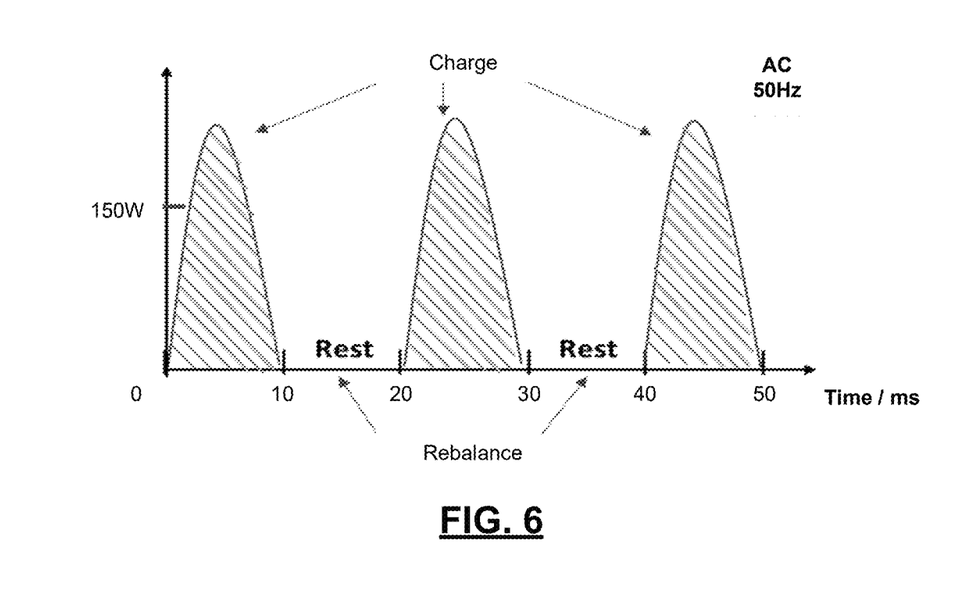
FIG. 6 is a graph illustrating charging and rest periods for one portion of the CAB module.

Referring now to FIGS. 5A to 6, current flowing through the CAB module 50 of FIG. 4A is shown. During a first half cycle shown in FIGS. 5A and 5B, the current forward biases the diode 64 and flows through the CABs 56 as shown to charge the CABs 56. During the first half cycle, the diode 66 is reverse biased and the capacitors and the batteries of the CABs 58 rebalance as shown in FIG. 6. While a 50 Hz AC signal is shown, other frequencies can be used.

Figure 5C:
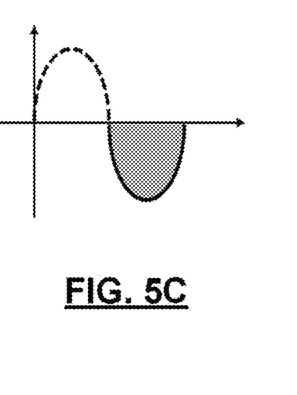
Figure 5D:
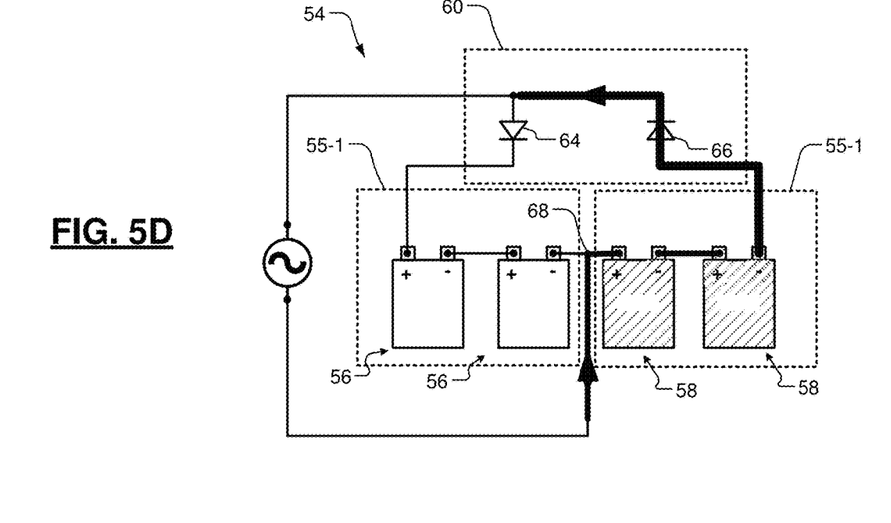

During a second half cycle shown in FIGS. 5C and 5D, current forward biases the diode 66 and flows through the CABs 58 as shown. During the second half cycle, the diode 64 is reverse biased and the capacitors and the batteries of the CABs 56 rebalance. As can be appreciated, while one side of the CAB module 50 is charging, the other side of the CAB module 50 is rebalancing power from the capacitor to the battery cell(s).

Figure 7:
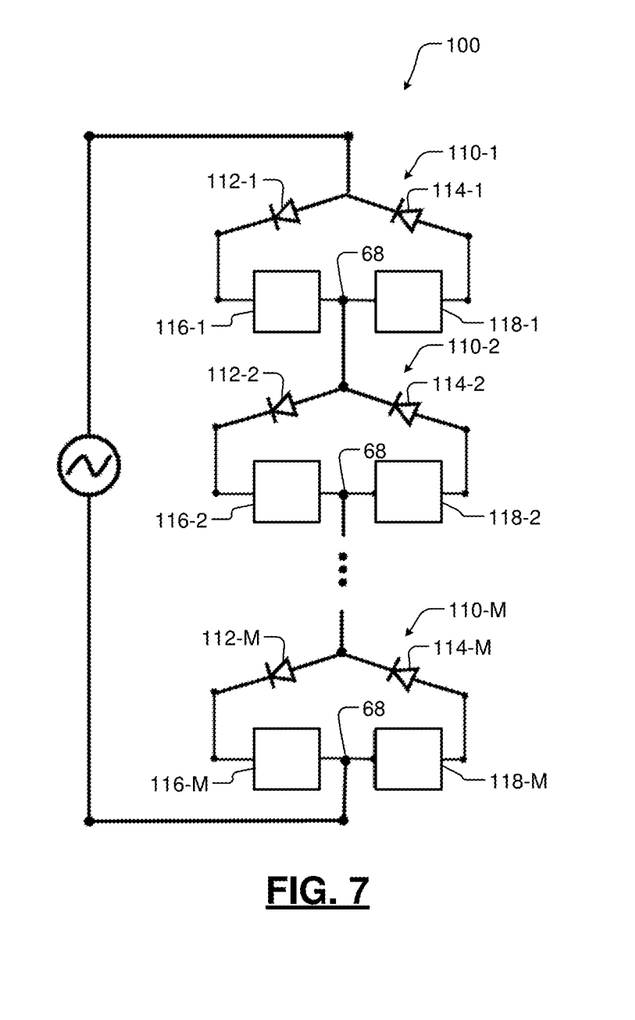

Referring now to FIGS. 7 to 9B, other circuit arrangements including CAB modules are shown. In FIG. 7, a battery system 100 includes CAB modules 110-1, 110-2, ..., 110-M connected in series to an AC source (where M is an integer greater than one). In some examples, each of the CAB modules 110 corresponds to a pair of 12V blocks. As described above, each of the CAB modules 110 includes one or more pairs of the diodes 112-1 and 112-2 and two or more CABs 116-1 and 116-2. A first terminal of the AC source is connected to the diodes 112-1 and 114-1 of the CAB module 110-1 and a second terminal of the AC source is connected to the node 68 between the CABs 116-M and 118-M of the CAB module 110-M. The CAB modules 110-2 to 110-(M-1) are connected together (the diodes of each of the CAB modules 110-2 to 110-(M-1) are connected to the node 68 of the prior CAB module 110).

Figure 8:
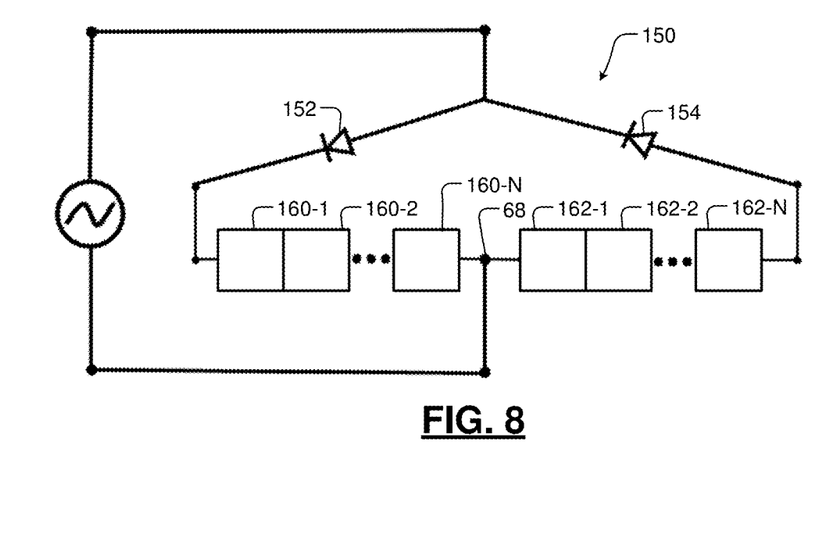

In FIG. 8, another topology is shown. A CAB module 150 includes diodes 152 and 156 connected to the CABs 160-1, 160-2, ... 160-N that are connected in series and the CABs 162-1, 162-2, ... 162-N that are connected in series. The AC source is connected to the diodes 152 and 156 as described above and to a node between the CABs 160-1, 160-2, ... 160-N and the CABs 162-1, 162-2, ... 162-N. In some examples, the CABs 160 provide 12V or 48V, although other voltages can be used. In some examples, each of the CABs is a 12 V block. In other examples, N=4 and each side of the CAB module 150 is a 48 V block.

Figure 9A:
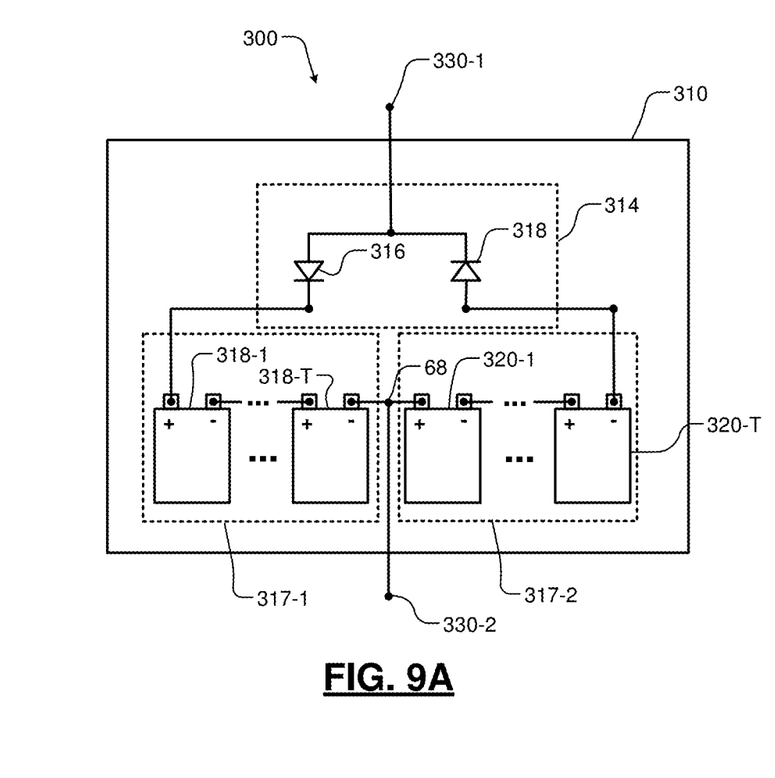
Figure 9B:
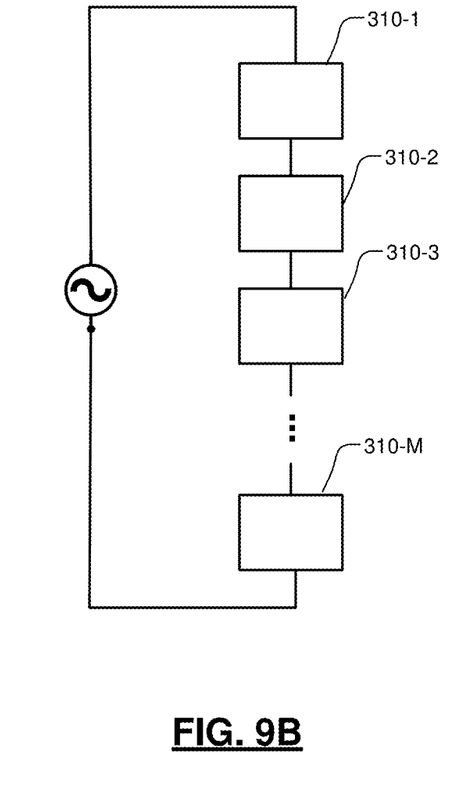

Referring now to FIGS. 9A and 9B, another arrangement for a battery system 300 is shown. In FIG. 9A, a CAB module 310 including one or more pairs of the diodes 316 and 318 connected as described above. A first CAB block 317-1 includes series connected CABs 318-1, ... and 318-T, although series, parallel and/or series and parallel connections can be used (where T is an integer greater than zero). A second CAB block 317-2 includes series connected CABs 320-1, ..., and 320-T, although series, parallel and/or series and parallel connections can be used.

In FIG. 9B, a plurality of the CAB modules 310-1, 310-2, ..., and 310-M are connected in series to the AC source (where M is an integer greater than one). A first node 330-1 of the CAB module 310-1 is connected to the anode of the diode 316 and to a cathode of the diode 318. The first node 330-1 of a CAB module 310-1 is connected to a first terminal of the AC source. A second node 330-2 of the CAB module 310-1 is connected to the first node 330-1 of the CAB module 310-2. The second node 330-2 of the CAB module 310-2 is connected to a first node 330-1 of a CAB module 310-3 and so on. A second node of the CAB module 310-M is connected to a second terminal of the AC source.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A capacitor assisted battery module comprising:
   a first diode including an anode and a cathode;
   a second diode including an anode and a cathode,
   wherein the anode of the first diode is directly connected to the cathode of the second diode at a first node;
   a first capacitor assisted battery (CAB) block including a positive terminal, a negative terminal and N CABs, where N is an integer greater than zero, wherein the positive terminal of the first CAB block is directly connected to the cathode of the first diode; and
   a second capacitor assisted battery (CAB) block including a positive terminal, a negative terminal and N CABs, wherein the negative terminal of the second CAB block is directly connected to the anode of the second diode, and
   wherein the negative terminal of the first CAB block and the positive terminal of the second CAB block are directly connected to a second node.

2. The capacitor assisted battery module of claim 1, wherein:
   the first node is configured for connection to a first terminal of an AC source, and
   the second node is configured for connection to a second terminal of the AC source.

3. The capacitor assisted battery module of claim 1, wherein each of the N CABs of the first CAB block includes a capacitor and a battery connected in parallel with the capacitor.

4. The capacitor assisted battery module of claim 1, wherein N is greater than one.

5. The capacitor assisted battery module of claim 1, wherein N is greater than one and wherein the N CABs of the first CAB block are connected in series.

6. The capacitor assisted battery module of claim 1, wherein N is greater than one and wherein the N CABs of the first CAB block are connected in parallel.

7. The capacitor assisted battery module of claim 1, further comprising:
   D first diodes connected in parallel with the first diode, where D is an integer greater than zero; and
   D second diodes connected in parallel with the second diode.

8. A battery system comprising:
   M capacitor assisted battery modules including the capacitor assisted battery module of claim 1, where M is an integer greater than one,
   wherein the capacitor assisted battery module of claim 1 is a first one of the M capacitor assisted battery modules,
   wherein the first node of the first one of the M capacitor assisted battery modules is configured for connection to a first terminal of an AC source,
   wherein a first node of second to $M^{th}$ ones of the M capacitor assisted battery modules are connected to a second node of the first one to the $(M-1)^{th}$ ones of the M capacitor assisted battery modules, respectively, and wherein the second node of the $M^{th}$ one of the M capacitor assisted battery modules is configured for connection to a second terminal of the AC source.

9. The battery system of claim 8, wherein the capacitor comprises a lithium ion capacitor.

10. The battery system of claim 8, wherein the battery comprises a lithium ion battery.

11. A capacitor assisted battery module comprising:
an AC switch comprising:
   a first node;
   D first diodes, wherein anodes of the D first diodes are directly connected to the first node and where D is an integer greater than zero; and
   D second diodes, wherein cathodes of the D second diodes are directly connected to the first node;
a first capacitor assisted battery (CAB) block including a positive terminal, a negative terminal and N CABs, where N is an integer greater than zero, wherein the positive terminal of the first CAB block is directly connected to the cathodes of the D first diodes; and
a second capacitor assisted battery (CAB) block including a positive terminal, a negative terminal and N CABs, wherein the negative terminal of the second CAB block is directly connected to the anodes of the D second diodes, and
wherein the negative terminal of the first CAB block and the positive terminal of the second CAB block are directly connected to a second node.

12. The capacitor assisted battery module of claim 11, wherein:
the first node is configured for connection to a first terminal of an AC source, and
the second node is configured for connection to a second terminal of the AC source.

13. The capacitor assisted battery module of claim 11, wherein each of the N CABs of the first CAB block includes a capacitor and a battery connected in parallel with the capacitor.

14. The capacitor assisted battery module of claim 11, wherein N is greater than one.

15. The capacitor assisted battery module of claim 11, wherein N is greater than one and wherein the N CABs of the first CAB block are connected in series.

16. The capacitor assisted battery module of claim 11, wherein N is greater than one and wherein the N CABs of the first CAB block are connected in parallel.

17. The capacitor assisted battery module of claim 11, wherein:
the D first diodes are connected in parallel; and
the D second diodes are connected in parallel.

18. A battery system comprising:
M capacitor assisted battery modules including the capacitor assisted battery module of claim 11, where M is an integer greater than one,
wherein the capacitor assisted battery module of claim 11 is a first one of the M capacitor assisted battery modules,
wherein the first node of the first one of the M capacitor assisted battery modules is configured for connection to a first terminal of an AC source,
wherein a first node of second to $M^{th}$ ones of the M capacitor assisted battery modules are connected to a second node of the first one to the $(M-1)^{th}$ ones of the M capacitor assisted battery modules, respectively, and
wherein the second node of the $M^{th}$ one of the M capacitor assisted battery modules is configured for connection to a second terminal of the AC source.

19. The battery system of claim 18, wherein the capacitor comprises a lithium ion capacitor.

20. The battery system of claim 18, wherein the battery comprises a lithium ion battery.

* * * * *